Figure 1:
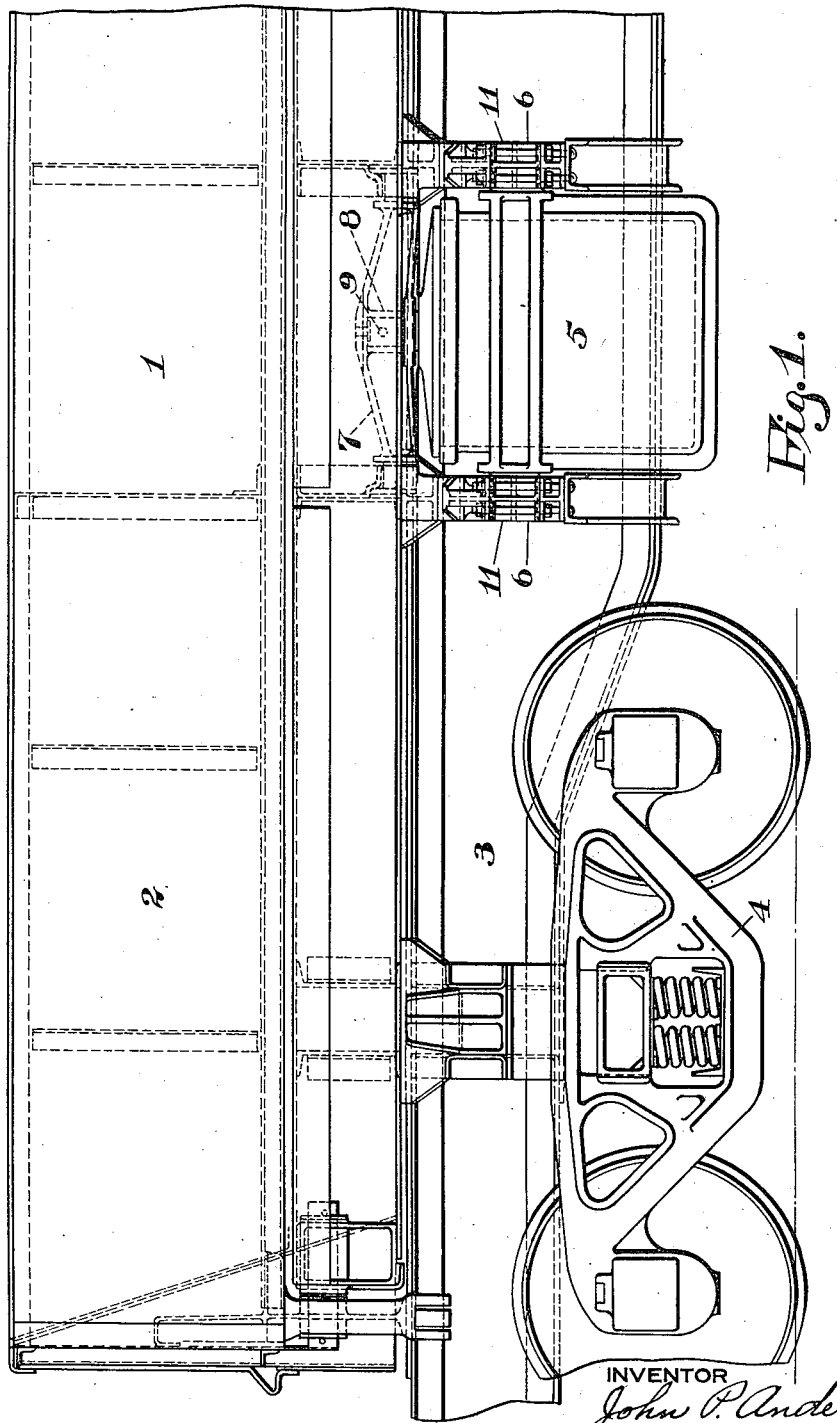

March 17, 1936.   J. P. ANDERSON   2,034,552
DUMP CAR
Filed April 8, 1931   2 Sheets-Sheet 1

INVENTOR
John P. Anderson
BY
his ATTORNEY

March 17, 1936.  J. P. ANDERSON  2,034,552
DUMP CAR
Filed April 8, 1931  2 Sheets-Sheet 2
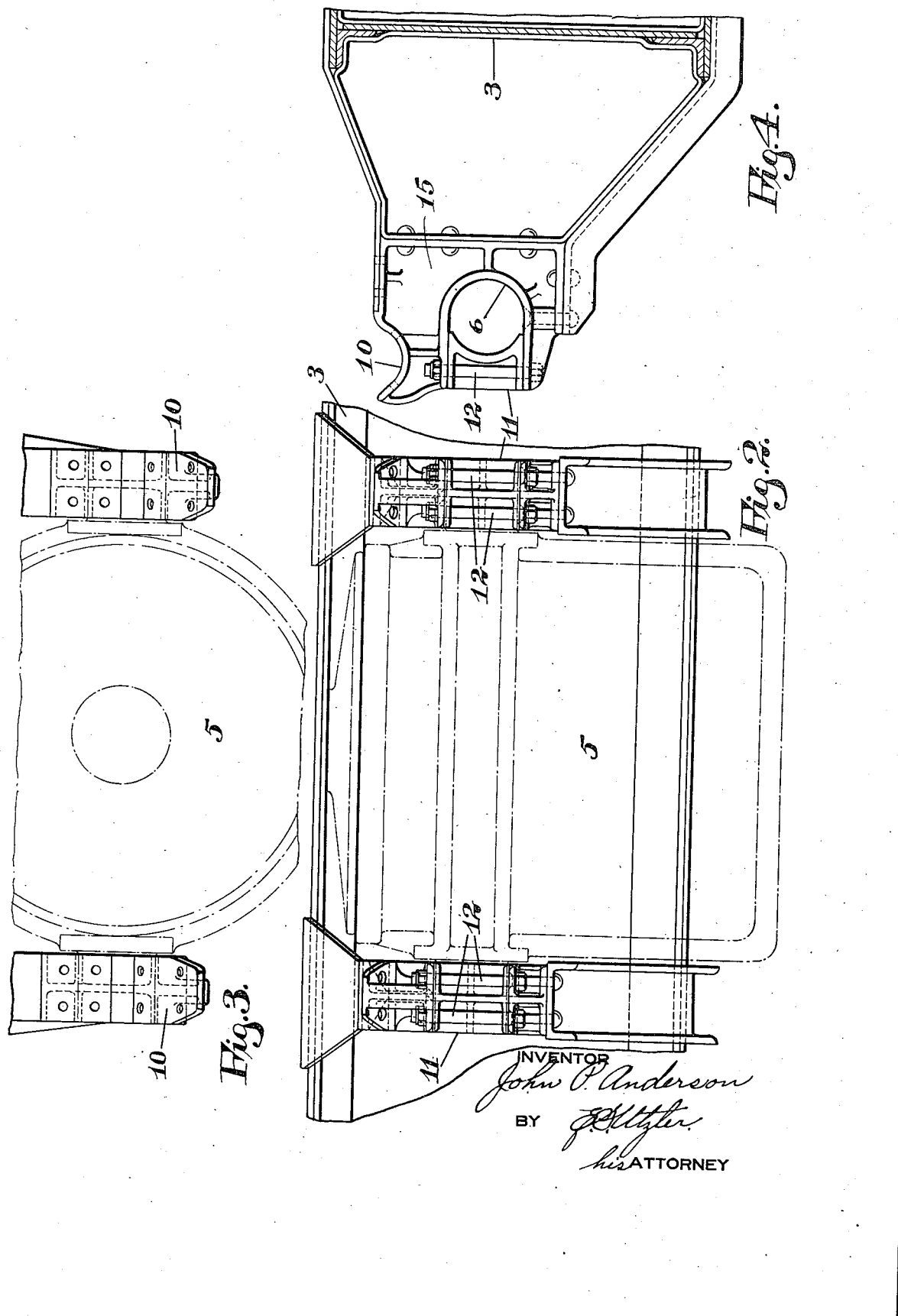

Patented Mar. 17, 1936

2,034,552

UNITED STATES PATENT OFFICE 2,034,552

DUMP CAR

John P. Anderson, Koppel, Pa., assignor, by mesne assignments, to Koppel Industrial Car and Equipment Company, McKees Rocks, Pa., a corporation of Pennsylvania Application April 8, 1931, Serial No. 528,536

5 Claims. (Cl. 105—272)

My invention relates to dump cars and particularly that type of car in which the body is supported on the underframe and adapted to be tilted to either side thereof by mechanical means. The usual means employed in cars of this type is a fluid pressure body tilting cylinder which is trunnion mounted on the underframe and may or may not be attached to the body. Heretofore in mounting this cylinder on the underframe there has been considerable difficulty in devising a means of support which would permit the cylinder to be readily removed from the underframe without disturbing the remainder of the car structure.

An object of my invention is to provide a combined bearing which acts as a support for the body during the tilting movements thereof and which also supports the body tilting cylinder and which permits the ready insertion or removal of the cylinder trunnions in their bearings without disturbing the body or other parts of the car structure.

Referring now to the drawings, Fig. 1 shows in elevation a portion of a dump car embodying my invention; Fig. 2 is an enlarged detail of the bearings upon which the body is tilted and which support the body tilting cylinder; Fig. 3 is a plan view of Fig. 2 and Fig. 4 shows in elevation the combined bearing of Fig. 2.

Referring now to the drawings where like reference characters refer to like parts, reference character 1 indicates a dump car 1 having a body 2 supported on an underframe 3 having the usual trucks 4 supporting the underframe. The method of supporting the body on the underframe forms no part of my invention as the body may be supported in stable equilibrium directly on the underframe and have trunnions which engage with suitable bearings when the body is tilted and about which bearings the body turns in dumping or the body may be mounted in stable equilibrium on its trunnions and tilt about the trunnions on either side thereof in dumping.

The body is tilted to either side thereof to discharge the lading by means of a fluid pressure actuated cylinder 5 having trunnions on either side thereof, supported in suitable bearings 6. I prefer to have a yoke member 7 pivotally mounted on the body on suitable trunnions at each side of the member 7 and provide a suitable bearing 8 upon the member 7 for the reception of one end of the piston rod secured to the piston mounted in the cylinder 5. A preferred form of securing the piston in the bearing 8 is by means of a pin 9 passing through the sides of the bearing 8 and the piston rod.

Adjacent each side of the car underframe are suitable bearings 10 for supporting the trunnions or pivots secured to the body and about which the body turns in dumping. In the embodiment of the invention as shown in Figs. 2 and 4 of the drawings I have joined the bearing 6 and 10 by web 15 and have provided a member 11 slidably mounted in the bearing 6 for retaining the trunnions of the cylinder 5 within the bearing 6. One means of retaining the member 11 within the bearing 6 are the bolts 12.

It will be apparent by referring to Figs. 1 and 4 of the drawings that the cylinder 5 may be mounted on the car by inserting the trunnions at each side of the cylinder within the pair of bearings 6 adjacent the side of the car and inserting the members 11 to retain these trunnions within the bearings 6. It is also apparent that should it be desired at any time to remove the cylinder from the car without disturbing the remainder of the car structure, the pin 9 can be withdrawn from the member 7, and the bolts 12 being removed from the members 6 and 11, the cylinder 5 can be removed from the car structure.

The advantages to be obtained by such an arrangement are the ready accessibility of the cylinder for repairs reducing the amount of labor necessary to remove the cylinder from the underframe and the increased leverage obtained by the wide separation of the body tilting cylinder and the trunnions on the opposite side of the car about which the body turns as the piston rises within the cylinder 5. It is of course to be understood that duplicate mechanisms are mounted adjacent the opposite side of the body for tilting the body towards the other side of the underframe.

Having thus described my invention, what I claim as new and desire to secure by Letters Patent is:

1. In a dump car having a tiltably mounted body and a power actuated body tilting mechanism, an integral bearing for supporting said body and mechanism, said bearing comprising a horizontally disposed body bearing, a horizontally disposed mechanism bearing and a vertically disposed horizontally movable member for holding said mechanism in position upon its bearing and reinforcing said body bearing portion.

2. In a dump car having a tiltable body and a body tilting mechanism, a bearing member comprising a vertically disposed web, angularly disposed offsets in the web extending inwardly from intersecting edges of the web, integrally formed transverse flanges defining said offsets and providing bearing supports for said body and mechanism.

3. In a dump car provided with a tiltable body and a power actuated body tilting mechanism, a combination body and mechanism trunnion bearing comprising angularly disposed vertically spaced supporting surfaces and a readily detachable member forming a closure for one of said surfaces and a vertical support for the other of said surfaces.

4. In a dump car having a body tiltable on trunnions and a trunnion supported body tilting mechanism, a combination body tilting mechanism and body trunnion supporting bearing, comprising a body portion having an upper face provided with suitable supporting surfaces to receive the body trunnion, a side face forming an angle with the upper face and provided with a horizontally disposed offset including a flat surface for receiving the body tilting mechanism trunnion and a removable member closing said offset and supported on said flat surface to retain the mechanism trunnion against displacement transversely of the car.

5. In a dump car having a body tiltable on trunnions and a trunnion mounted tilting mechanism, a combination tilting mechanism trunnion and body trunnion supporting bearing comprising a vertically disposed web having vertically spaced indentures therein, flanges disposed transversely to said web at said indentures to provide supports for said trunnions and a detachable member secured between two of said flanges.

JOHN P. ANDERSON.